US011992816B2

United States Patent
Poinsot et al.

(10) Patent No.: US 11,992,816 B2
(45) Date of Patent: May 28, 2024

(54) INJECTION AND MIXING DEVICE FOR EXHAUST LINE

(71) Applicant: FAURECIA SYSTEMES D'ECHAPPEMENT, Nanterre (FR)

(72) Inventors: Laurent Poinsot, Hericourt (FR); Nicolas Vicaire, Ecot (FR); Sylvain Dhondt, Saint-Germain (FR); Alain Engel, Meroux-Moval (FR)

(73) Assignee: FAURECIA SYSTEMES D'ECHAPPEMENT, Nanterre (FR)

( * ) Notice: Subject to any disclaimer, the term of this patent is extended or adjusted under 35 U.S.C. 154(b) by 60 days.

(21) Appl. No.: 18/080,846

(22) Filed: Dec. 14, 2022

(65) Prior Publication Data

US 2023/0191343 A1 Jun. 22, 2023

(30) Foreign Application Priority Data

Dec. 17, 2021 (FR) ...................................... 21 13868

(51) Int. Cl.
*B01F 25/31* (2022.01)
*B01F 23/213* (2022.01)
(Continued)

(52) U.S. Cl.
CPC ...... *B01F 25/3131* (2022.01); *B01F 23/2132* (2022.01); *F01N 3/2892* (2013.01); *F01N 2240/20* (2013.01); *F01N 2610/02* (2013.01)

(58) Field of Classification Search
CPC .............. B01F 25/3131; B01F 23/2132; F01N 3/2892; F01N 2240/20; F01N 2610/02
(Continued)

(56) References Cited

U.S. PATENT DOCUMENTS 8,056,671 B2 * 11/2011 Ikegami .............. F01N 13/1822
180/309
2016/0265409 A1 * 9/2016 Püschel ............... B01F 25/3131
(Continued)

FOREIGN PATENT DOCUMENTS

CH 715208 A1 * 1/2020 .......... B01F 3/04049
CN 715208 A1 1/2020
(Continued)

OTHER PUBLICATIONS

Preliminary Search Report for French Application No. 2113868 dated Jul. 19, 2022.

*Primary Examiner* — Kenneth J Hansen
*Assistant Examiner* — Kelsey L Stanek
(74) *Attorney, Agent, or Firm* — Carlson, Gaskey & Olds, P.C.

(57) ABSTRACT

An injection and mixing device comprises a casing having an exhaust inlet and an exhaust outlet, the casing internally defining a passage for exhaust gases from the exhaust inlet to the exhaust outlet. The exhaust inlet opens into an inlet region of the passage. The injection and mixing device further includes an injector of a liquid comprising a nitrogen oxide reducing agent or a precursor of such a reducing agent. A deflector is housed within the casing and defines in the passage a first passage connecting the inlet region to the exhaust outlet, in which the exhaust gases flow at a first average velocity, and a second passage connecting the inlet region to the exhaust outlet, in which the exhaust gases flow at a second average velocity lower than the first average velocity, The injector injects liquid into the second passage.

15 Claims, 4 Drawing Sheets

(51) Int. Cl.
*B01F 25/313* (2022.01)
*F01N 3/28* (2006.01)

(58) Field of Classification Search
USPC .......................................................... 60/295
See application file for complete search history.

(56) References Cited

U.S. PATENT DOCUMENTS

2016/0363027 A1* 12/2016 Lorenz .................. F01N 3/2892
2020/0009514 A1    1/2020  Quan et al.

FOREIGN PATENT DOCUMENTS

EP    3067529 A1    9/2016
GB    2539328 A    12/2016

* cited by examiner

INJECTION AND MIXING DEVICE FOR EXHAUST LINE

CROSS-REFERENCE TO RELATED APPLICATION

This application is a U.S. non-provisional application claiming the benefit of French Application No. 21 13868, filed on Dec. 17, 2021, which is incorporated herein by reference in its entirety.

TECHNICAL FIELD

The disclosure relates to an exhaust line injection and mixing device for injecting a liquid including a nitrogen oxide reducing agent or a precursor of such a reducing agent into the exhaust line.

BACKGROUND

Exhaust lines can be fitted with so-called SCR (Selective Catalytic Reduction) catalytic systems. These catalytic systems convert the nitrogen oxides present in the exhaust gas, in the presence of the reducing agent, into nitrogen gas.

The reducing agent is typically ammonia.

The exhaust line then has an injector to inject the nitrogen oxide reducing agent into the exhaust gas upstream of the SCR catalytic system. Alternatively, the injector injects a precursor of the nitrogen oxide reducing agent, for example urea, which generates ammonia gas after hydrolysis and thermolysis.

The nitrogen oxide reducing agent is typically injected in liquid form.

When the injector is of the low SMD (Sauter Mean Diameter) type, the dispersion of the liquid droplets in the exhaust gas is not satisfactory.

Such injectors produce a jet of droplets with a small average diameter, typically between 20 and 30 micrometres.

These droplets are small and therefore have low mass and kinetic energy. As a result, they are easily deflected by the exhaust gas stream.

The droplets can thus easily be pressed against a so-called cold wall by the exhaust gas. In this case, they can settle and form a deposit that disrupts the original gas stream pattern and increases back pressure.

In this context, the disclosure aims to provide an injection and mixing device which operates satisfactorily for low-SMD injectors.

SUMMARY

To this end, the disclosure relates in a first aspect to an exhaust line injection and mixing device, the device comprising:—a casing having an exhaust inlet and an exhaust outlet, the casing internally defining a passage for exhaust gases from the exhaust inlet to the exhaust outlet, the exhaust inlet opening into an inlet region of the passage;

an injector of a liquid comprising a nitrogen oxide reducing agent or a precursor of such a reducing agent, the injector being mounted on a wall of the casing directed towards the exhaust outlet;

a deflector housed within the casing and defining in the passage a first passage connecting the inlet region to the exhaust outlet, in which the exhaust gases flow at a first average velocity, and a second passage connecting the inlet region to the exhaust outlet, in which the exhaust gases flow at a second average velocity lower than the first average velocity, the injector injecting liquid into the second passage.

Thus, the deflector allows the stream of exhaust gas through the passage to be distributed into a low velocity stream and a high velocity stream. The injector injects the liquid including the reducing agent or reducing agent precursor into the stream at low velocity.

The liquid jet is deflected only slightly or not at all by the low velocity gas stream.

When the injector is of the low SMD type, the injection and mixing of the reducing agent droplets into the exhaust gas stream is satisfactory.

On the other hand, only some of the exhaust gas stream flows through the second passage. The other part of the exhaust stream flows through the first passage, and thus experiences only a small reduction in speed.

As a result, the injection and mixing device generates a lower back pressure than if the entire exhaust gas stream was decelerated and flowing at low velocity.

The injection and mixing device may furthermore exhibit one or more of the following features, taken in isolation or in any combination that is technically possible:
the deflector comprises a perforated plate, through which the second passage communicates with the inlet area;
the perforated plate forms an angle of between 0° and 60°, advantageously between 30° and 45°, with a central axis of the exhaust inlet;
the perforated plate has a void ratio of between 10% and 70%, preferably between 40% and 55%;
the deflector comprises an impactor plate, the injector injecting liquid in an injection direction towards the exhaust outlet, the impactor plate being interposed between the injector and the exhaust outlet;
the impactor plate is substantially flat and has a less than 25° angle normal to the direction of injection;
the casing comprises a first casing portion and a second casing portion attached to each other, the perforated plate being integral with the first casing portion, the impactor plate being integral with the second casing portion, the perforated plate and the impactor plate being disengaged from each other;
the casing comprises a tubular casing portion defining the exhaust outlet, the deflector comprising a tubular deflector portion engaged in the tubular casing portion and constituting a downstream section of the second passage;
the tubular deflector portion is coaxial with the tubular casing portion;
the tubular deflector portion and the tubular casing portion define between them an annular channel constituting a downstream section of the first passage;
a flexible duct is mounted on the tubular casing portion, the tubular deflector portion extending beyond the tubular casing portion into the flexible duct;
the first passage has a passage inlet opening into the inlet region, the inlet region having a passage cross-section narrowing from the exhaust inlet to the inlet of the first passage.

According to a second aspect, the disclosure relates to an exhaust line comprising an injection and mixing device having the above characteristics, the exhaust outlet being fluidly connected to the exhaust inlet of an SCR catalytic system.

According to a third aspect, the disclosure relates to a manufacturing method having the above features, the method comprising the following steps:

obtaining the first casing portion;
obtaining the second casing portion;
attaching the perforated plate to the first casing portion;
attaching the impactor plate to the second casing portion
attaching the first casing portion and the second casing portion to each other.

BRIEF DESCRIPTION OF THE DRAWINGS

Further features and advantages of the disclosure will be apparent from the detailed description given below, by way of indication and not in any way limiting, with reference to the appended figures, among which.

DETAILED DESCRIPTION

Figure 1:
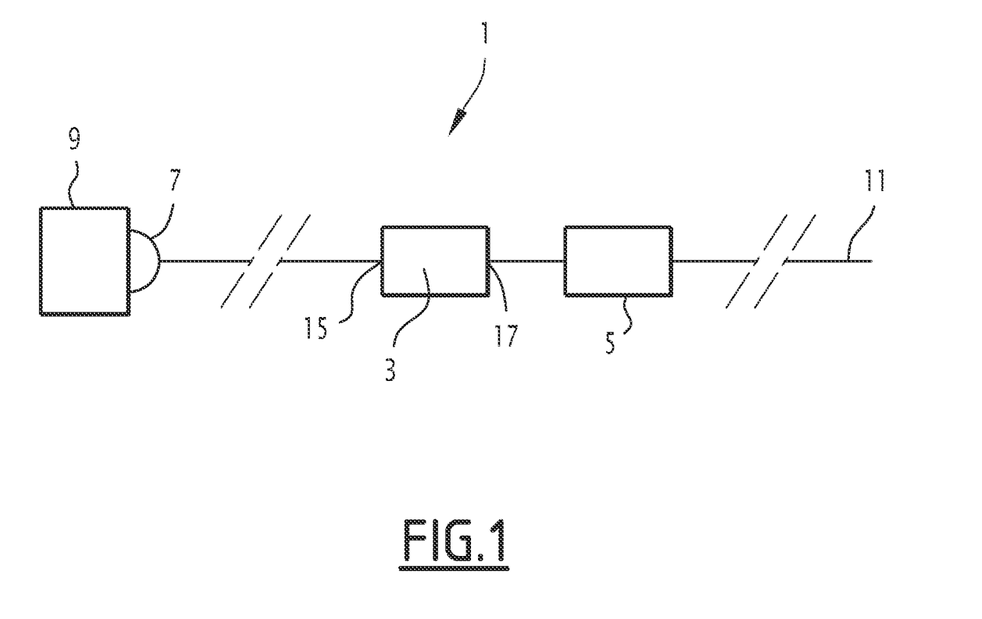
FIG. 1 is a schematic depiction of an exhaust line according to the disclosure.

The exhaust line 1 shown in FIG. 1 comprises an injection and mixing device 3, which is intended to inject a liquid including a nitrogen oxide reducing agent or a precursor of such a reducing agent into the exhaust gases. Downstream of the injection and mixing device 3, the exhaust line 1 has an SCR (Selective Catalytic Reduction) catalytic system 5.

The SCR catalytic system, in the presence of a nitrogen oxide reducing agent, reduces NOx to $N_2$ gas.

Upstream, the injection and mixing device 3 is fluidly connected to a manifold 7, collecting the exhaust gases leaving the engine combustion chambers 9. Downstream, the SCR catalytic system is connected to a nozzle 11 through which the purified exhaust gases are released into the atmosphere.

Equipment such as a turbocharger is interposed between the manifold 7 and the injection and mixing device 3.

Other equipment, such as silencers, are interposed between the SCR catalytic system 5 and the nozzle 11.

Figure 2:
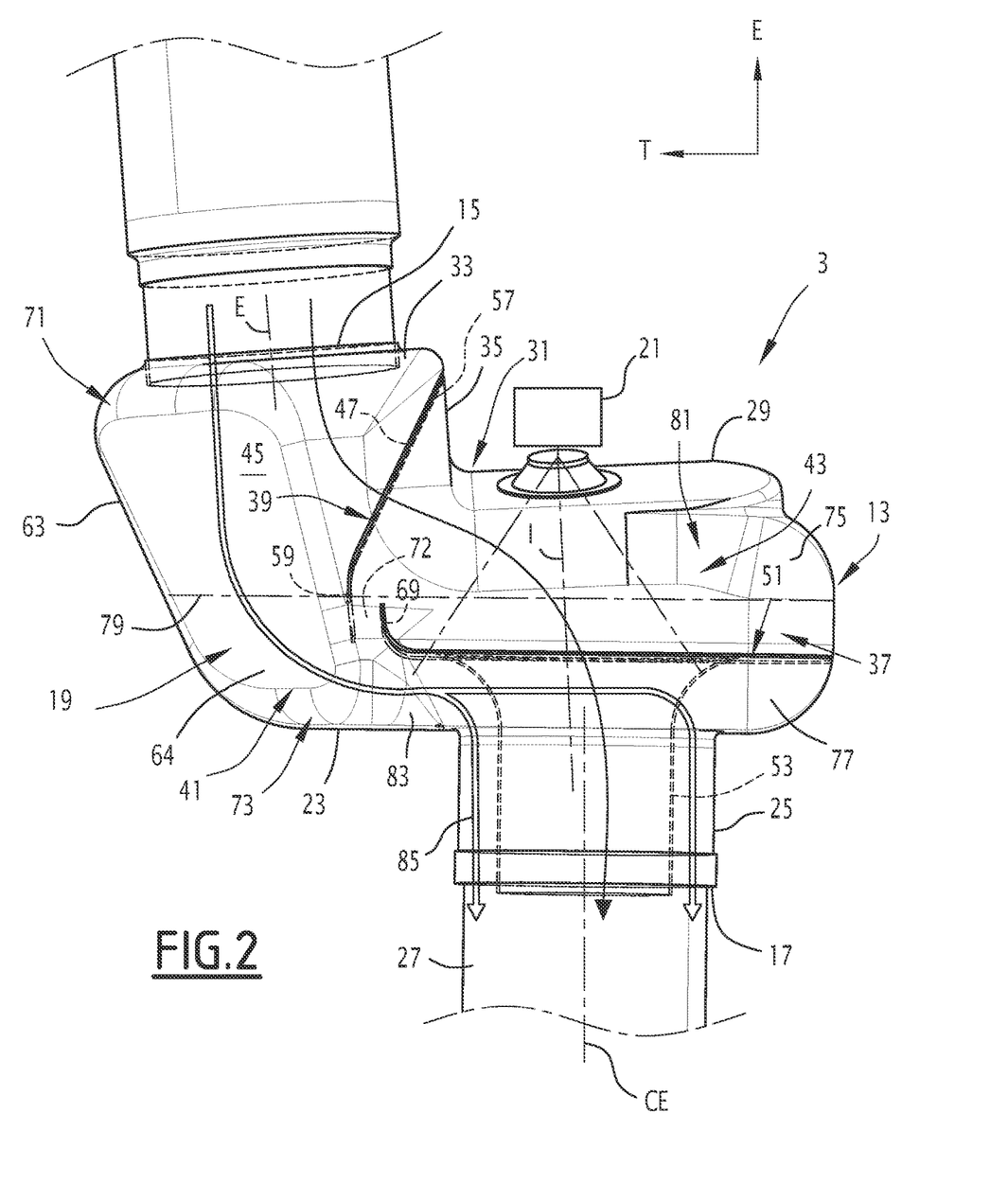
FIG. 2 is a side view of the injection and mixing device of FIG. 1, for a first embodiment of the disclosure, with the deflector visible through the casing.
Figure 3:
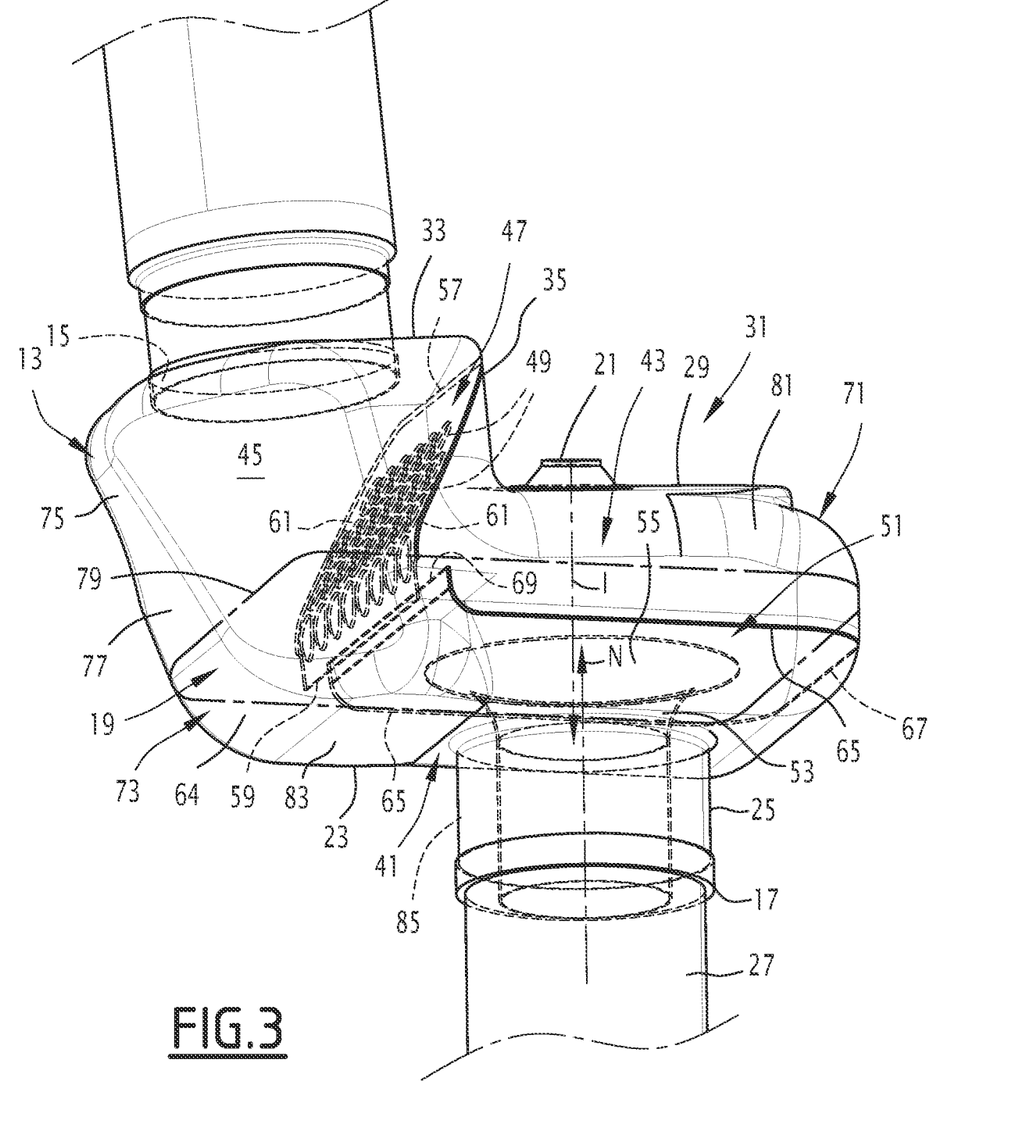
FIG. 3 is a perspective view of the injection and mixing device of FIG. 2, with the deflector plate visible through the casing.

The injection device 3 is more clearly depicted in FIGS. 2 and 3.

It comprises a casing 13 with an exhaust inlet 15 and an exhaust outlet 17.

The casing 13 internally defines a passage 19 for the exhaust gases from the exhaust inlet 15 to the exhaust outlet 17.

The injection and mixing device 3 further comprises an injector 21 for a liquid comprising a nitrogen oxide reducing agent or a precursor of such a reducing agent.

Typically, the liquid is an aqueous solution of urea. Urea is a precursor of a nitrogen oxide reducing agent, which after hydrolysis and thermolysis in contact with the exhaust gases breaks down into ammonia gas.

In one variant, the liquid is liquid ammonia, or any other suitable liquid.

As shown in FIG. 2, the casing 13 has a bottom 23.

The casing 13 also includes a tubular casing portion 25, defining the exhaust outlet 17. The tubular casing portion 25 connects to the bottom 23 and projects from the bottom 23 towards the outside of the casing.

The tubular casing portion 25 has a central axis CE.

Perpendicular to the central axis, the tubular casing portion 25 has circular sections.

Typically, a flexible duct 27 is connected to the tubular casing portion 25.

The flexible duct 27 typically connects the outlet 17 to the inlet of the SCR catalytic system 5.

The injector 21 is mounted on a wall 29 of the casing 13 facing the exhaust outlet 17.

"Facing the outlet" means that the injector 21 is directed towards the outlet at an angle of up to 60°, ideally 30° and preferably directly opposite, i.e. at an angle of substantially 0°.

The wall 29 is located opposite the exhaust outlet 17 in a direction of elevation E.

The direction of elevation E is typically parallel to the central axis CE.

More precisely, the casing 13 has, opposite the bottom 23, another bottom 31.

In the example shown, the other bottom 31 is stepped. In addition to wall 29, it has another wall 33. The exhaust inlet 15 is located in the other wall 33.

The wall 29 is, in the direction of elevation E, relatively closer to the bottom 23 than the other wall 33. The walls 29 and 33 are connected to each other by an intermediate wall 35, which in the example shown is substantially parallel to the direction of elevation E.

The wall 29 is substantially parallel to the bottom 23.

Similarly, the other wall 33 is substantially parallel to the bottom 23.

The bottom 23 and the other bottom 31 are connected to each other by a peripheral side wall 37. The peripheral side wall 37 has a closed contour.

The injection and mixing device 3 further comprises a deflector 39 housed inside the casing 13 and defining in the passage 19 a first passage 41 and a second passage 43.

As can be seen in FIG. 2, the exhaust inlet 15 opens into an inlet region 45, belonging to the passage 19. The inlet region 45 corresponds to the upstream end of the passage 19.

The first passage 41 connects the inlet region 45 to the outlet 17.

It is arranged such that the exhaust gases flow at a first average velocity along said first passage 41.

The second passage 43 also connects the inlet region 45 to the outlet 17. It is arranged such that the exhaust gases flow at a second average velocity along said second passage 43.

The second average velocity is lower than the first average velocity.

The first average velocity can be calculated by averaging the velocities of all the gas molecules passing through the first passage. The velocity of each gas molecule considered here is the average velocity of the gas molecule throughout the first passage.

The second average velocity is calculated in the same way, the important thing being to keep a similar calculation method for the first and second average velocity The gas flowing through the first passage is therefore at high velocity, typically at a speed of about 60 m/s. The gas flowing through the second passage is therefore at low velocity, typically at a speed of about 40 m/s. At the exhaust inlet 15 and the exhaust outlet 17, the gas typically flows at a speed of about 80 m/s.

The injector 21 is typically a low SMD injector.

In other words, the injector 21 is of the type that injects liquid droplets with an average diameter of between 10 and 50 micrometers, preferably between 20 and 30 micrometers.

In a variant, the injector is of a different type.

The injector injects the liquid along an injection direction I, shown in FIGS. 2 and 3.

The direction of injection I corresponds here to the general direction in which the liquid droplets are injected into the casing 13.

When the injector 21 is of the conical jet type, the direction of injection I corresponds to the central axis of the cone. When the injector 21 is of the type that generates several conical jets, the direction of injection I corresponds to the direction in the middle of the respective axes of the cones.

The direction of injection I is, for example, coincident with the central axis CE of the tubular casing portion 25. In the example shown, the injection direction I is not strictly parallel to the central axis CE. The injector 21 is not placed in the extension of the central axis CE, but slightly offset to the side. The direction of injection I then forms an angle of less than 25°, preferably less than 15°, with the central axis CE.

The injector 21 injects the liquid into the second passage 43.

For this purpose, the part of the passage 19 adjacent to the wall 29 belongs to the second passage 43.

However, the part of the passage 19 adjacent to the bottom 23 belongs to the first passage 41.

The deflector 39 comprises a perforated plate 47, through which the second passage 43 communicates with the inlet area 45. As can be seen in FIG. 2, this plate has multiple holes 49. The holes 49 are distributed substantially over the entire surface of the perforated plate 47, preferably evenly distributed.

The perforated plate 47 thus delimits the second passage 43 upstream.

In this application, upstream and downstream are understood to be relative to the normal flow direction of the exhaust gases.

The perforated plate 47 forms an angle of between 0° and 60°, advantageously between 30° and 45°, with a central axis E of the exhaust inlet 15.

The central axis E corresponds to the axis perpendicular to the plane of the exhaust inlet 15, and passes through the centre of same.

The perforated plate 47 has a void ratio of between 10% and 70%, preferably between 40% and 55%.

The void ratio is the ratio of empty area to solid area in the perforated plate.

The deflector 39 further comprises an impactor plate 51.

The impactor plate 51 is interposed between the injector 21 and the exhaust outlet 17.

More precisely, it is interposed in the direction of injection I between the injector 21 and the exhaust outlet 17.

The impactor plate 51 is typically substantially parallel to the bottom 23.

The normal N to the impactor plate 51 forms an angle α of less than 25°, preferably less than 15°, with the injection direction I.

The deflector 39 further comprises a tubular deflector portion 53 engaged with the tubular casing portion 25 and forming a downstream section of the second passage 43.

The tubular deflector portion 53 is typically coaxial with the tubular casing portion 25. It has a central axis which is typically coincident with the central axis CE of the tubular casing portion.

Perpendicular to its central axis, the tubular deflector portion 53 has circular sections of equal diameter.

The tubular deflector portion 53 is integral with the impactor plate 51. It protrudes from the plate 51 in a direction away from the injector 21.

Specifically, the impactor plate 51 has a hole 55, with one end of the tubular deflector portion 53 connecting to the edge of the hole 55. Said end of the tubular deflector portion 53 flares outwards and has a general quarter-torus shape. Such a shape is called a tulip shape.

The tubular deflector portion 53 typically extends to the exhaust outlet 17. Advantageously, it extends beyond the exhaust outlet 17, and its end is engaged in the flexible duct 27.

Thus, the tubular deflector portion 53 and the tubular casing portion 25 define between them an annular channel constituting a downstream section of the first passage 41.

The perforated plate 47 is bounded by a first longitudinal edge 57, a second longitudinal edge 59 and two lateral edges 61 connecting the longitudinal edges 57, 59 to each other.

The longitudinal direction L is perpendicular to the direction of elevation E.

The first longitudinal edge 57 is rigidly attached to the intermediate wall 35, close to the other wall 33.

The second longitudinal edge 59 is located substantially level with the impactor plate 51.

The side edges 61 are pressed against and rigidly attached to the peripheral wall 37.

The perforated plate 47 is inclined with respect to the direction of elevation E. When following the perforated plate 47 from the first longitudinal edge 57 to the second longitudinal edge 59, that plate moves away from the intermediate wall 35 and the other wall 33. Thus, the first longitudinal edge 57 is not located under the exhaust inlet 15, along the direction of elevation E, while the second longitudinal edge 59 is located under the inlet 15.

The area 63 of the side peripheral wall 37 opposite the perforated plate 47 in a transverse direction T is also inclined.

The transverse direction T is perpendicular to the direction of elevation E and perpendicular to the longitudinal direction L.

More precisely, when following the area 63 from the other wall 33 towards the bottom 23, this area 63 approaches the perforated plate 47 transversely.

In other words, when viewed in section perpendicular to the longitudinal direction L as shown in FIG. 2, the perforated plate 47 and the area 63 converge towards each other.

Thus, the inlet region 45 has a decreasing cross-sectional area from the exhaust inlet 15 to the inlet 64 of the first passage 41.

This allows the stream of exhaust gases to the first passage 41 to remain at a substantially constant speed, although some of the stream is directed to the second passage 43.

The impactor plate 51 is bounded by two transverse edges 65 and two longitudinal edges 67, 69.

The transverse edges 65, and the longitudinal edge 67 opposite the perforated plate 47, are arranged along, and typically in contact with, the peripheral side wall 37.

The longitudinal edge 69 extends opposite and along the longitudinal edge 59 of the perforated plate 47. A gap 72 separates the edges 59 and 69.

The impactor plate 51 is substantially flat, except for the edge 69 which is curved and rises towards the wall 29.

As mentioned above, the impactor plate 51 is substantially perpendicular to the direction of elevation E. In this direction of elevation E, it is relatively closer to the bottom 23 than to the wall 29. For example, in the direction of elevation E, the distance between the impactor plate 51 and the bottom 23 is between 30% and 50% of the distance between the impactor plate 51 and the wall 29.

The casing 13 comprises a first casing portion 71 and a second casing portion 73 attached to each other.

The first casing portion 71 typically comprises the wall 29, the other wall 33, the intermediate wall 35, and a portion 75 of the peripheral side wall 37.

The second casing portion 73 comprises the bottom 23, the tubular casing portion 25, and another portion 77 of the peripheral side wall 37.

The first casing portion 71 and the second casing portion 73 are in contact with each other along a closed contour line 79, illustrated in FIGS. 2 and 3.

The two casing portions 71, 73 are in contact with each other via the side wall portions 75, 77, which meet at the closed contour line 79.

The two casing portions 71, 73 are typically welded together.

Advantageously, the perforated plate 47 is integral with the first casing portion 71. The impactor plate 51 is integral with the second casing portion 73.

Furthermore, as can be seen in the figures, the perforated plate 47 and the impactor plate 51 are disengaged from each other. In other words, they are not directly linked to each other. The figures show that they are separated by the gap 72.

Such an arrangement allows for easy installation of the injection and mixing device.

The low velocity flow passage 43 comprises a first volume 81, into which the injection of liquid is performed. This first volume 81 is delimited along the direction of elevation E between the impactor plate 51 and the wall 29. In the transverse direction T, it is delimited between the perforated plate 47 and the side peripheral wall 37. In the longitudinal direction L, it is delimited between two areas of the side peripheral wall 37.

The second passage 43 extends into the interior of the tubular deflector portion 53, which forms the downstream section of the second passage, as described above.

The first passage 41 comprises the volume 83 delimited between the impactor plate 51 and the bottom 23. This first volume 83 is extended by an annular channel 85, delimited between the tubular deflector portion 53 and the tubular casing portion 25. This annular channel 85 constitutes the downstream section of the first passage 41.

The operation of the injection and mixing device will now be described.

The exhaust gases enter the casing 13 through the exhaust inlet 15.

From this inlet 15, it flows into the inlet region 45.

Part of the exhaust gas stream passes through the perforated plate 47, through the holes 49.

This reduces the velocity of the exhaust gases.

This low velocity fraction of the exhaust gas stream follows the second passage 43. It first passes through the volume 81 and then flows through the tubular deflector portion 53 to the exhaust outlet 17.

The injector 21 injects the liquid into the volume 81. One portion of the liquid jet strikes the impactor plate 51 around the hole 55. Another portion is injected directly into the volume delimited by the tubular deflector portion 53. It is not intercepted by the impactor plate 51.

The part of the exhaust gas stream that does not pass through the perforated plate 47 flows through the inlet region 45 to the inlet 64 of the first passage 41. As the cross-sectional area narrows from the exhaust inlet 15 to the inlet 64 of the first passage 41, the velocity of the exhaust gas is not reduced. This high-velocity fraction of the exhaust gas follows the first passage 41. It first flows into the volume 83, then is directed to the annular channel 85, and flows around the tubular deflector portion 53.

The high-velocity fraction of the exhaust gas does not undergo any pronounced acceleration or deceleration, so that the gas stream does not generate any back pressure, or only a very low back pressure.

The high-velocity stream exiting the annular channel 85 and the low-velocity stream exiting the tubular deflector portion 53 are substantially parallel to each other. This reduces back pressure.

Typically, the fraction of the exhaust gas stream directed to the second passage 43 is between 30% and 70% of the total stream, more preferably between 40 and 60%, and is for example 50%.

The injection and mixing device according to the first embodiment is mounted as follows.

The perforated plate 47 is first attached to the first casing portion 71.

The impactor plate 51, carrying the tubular deflector portion 53, is attached to the second casing portion 73.

The first and second casing portions are then attached to each other, with the impactor plate and the perforated plate coming together as shown in FIGS. 2 and 3.

Figure 4:
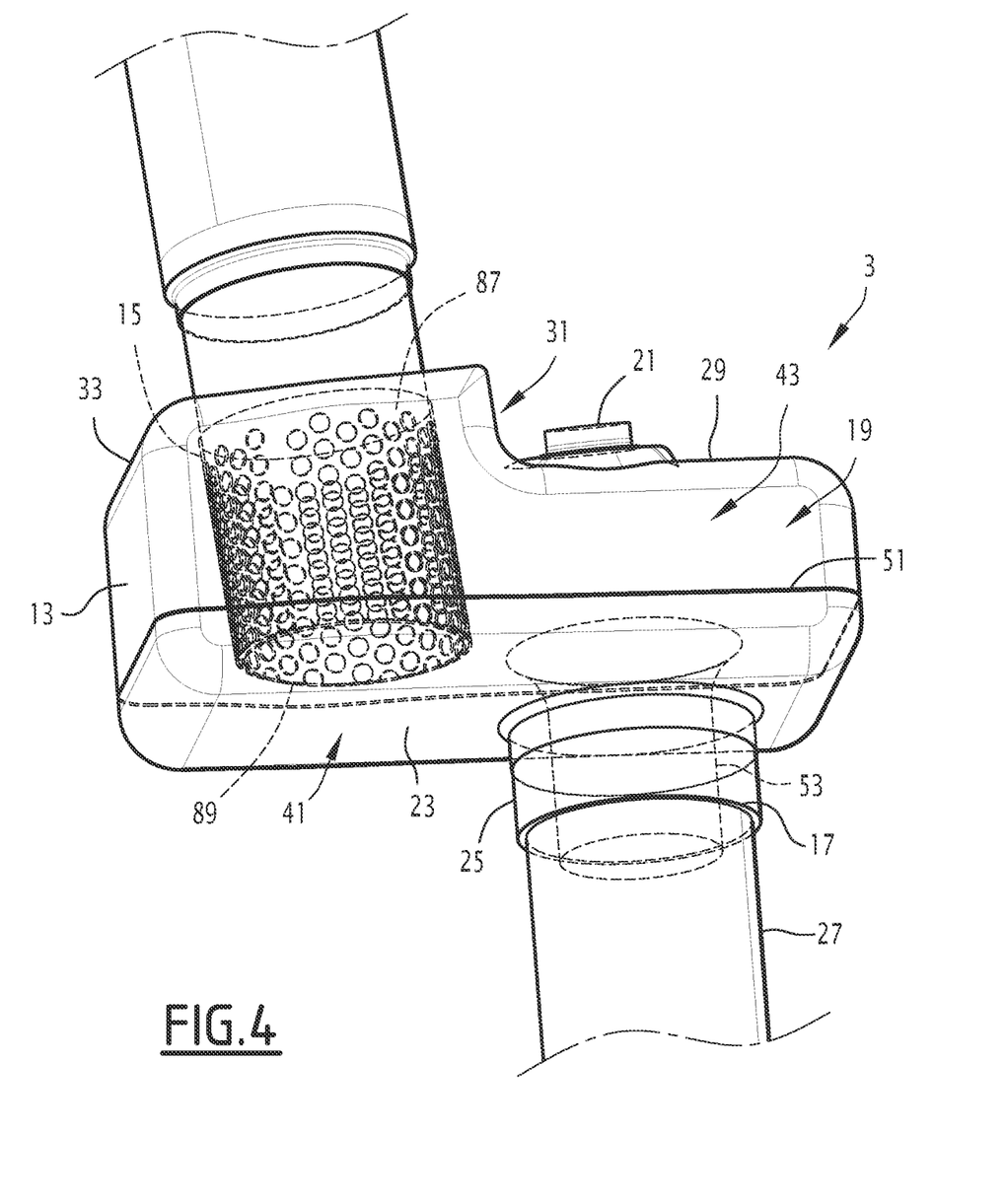
FIG. 4 is a perspective view of a second embodiment of the injection and mixing device.

A second embodiment of the disclosure will now be described with reference to FIG. 4. Only the points in which this second embodiment differs from the first will be detailed below. Elements that are identical or perform the same function will be designated by the same references.

In the second embodiment, the impactor plate 51 occupies the entire internal section of the casing 13.

In other words, the outer edge of the impactor plate 51 extends in close proximity to the peripheral side wall 37 around its entire periphery.

The perforated plate 47 is replaced by a perforated tube 87. The perforated tube 87 extends from the exhaust inlet 15 to a hole 89 in the impactor plate 51.

The perforated tube 87 is substantially straight, and is perforated along its entire length and periphery.

The hole 89 is longitudinally offset from hole 55. It is located, in the direction of elevation E, in the extension of the exhaust inlet 15.

The inlet region 45 here corresponds to the internal volume of the perforated tube 87.

The second passage 43 comprises the entire volume between the impactor plate 51 and the other bottom 31, with the exception of the inlet region 45. The first passage 41 comprises the entire volume between the bottom 23 and the impactor plate 51.

In this embodiment, the perforated tube 87 is integral with the impactor plate 51.

The deflector assembly 39, i.e. the impactor plate 51, the perforated tube 87 and the tubular deflector portion 53, is integral with the second casing portion 73.

Exhaust gases entering through the exhaust inlet 15 inside the casing 13 flow into the inlet region 45, i.e. the region bounded inside the perforated tube 87. Part of this stream passes through the perforated tube 87, and follows the second passage 43. Another part of the exhaust gas stream flows along the perforated tube 87 to the hole 89 and then flows into the first passage 41.

The injection and mixing device according to the second embodiment is mounted as follows.

The impactor plate 51, the perforated tube 87 and the tubular deflector portion 53 are first assembled to each other. This sub-assembly is rigidly attached to the second casing portion 73. Finally, the first casing portion and the second casing portion are attached to each other. The tube 87 is placed opposite and in the extension of the exhaust inlet 15.

One variant of the first embodiment will now be described. This variant is not shown in Figure.

Only the points in which this variant differs from that of FIGS. 2 to 3 will be detailed below.

In this variant, the perforated plate 47 and the impactor plate 51 are integral with each other. In other words, the lower longitudinal edge 59 of the perforated plate is connected to the longitudinal edge 69 of the impactor plate 51. However, the perforated plate 47 is not rigidly attached to the peripheral side wall 37 of the casing. There is a slight gap between the upper longitudinal edge 57 and the edges 61 of the plate on the one hand and the peripheral side wall 37 on the other.

In this variant, the deflector 39 is first manufactured. The deflector 39 comprises the perforated plate 47, the impactor plate 51 and the tubular deflector portion 53. These various components are integral with each other.

The deflector 39 is then attached to the second casing portion 73.

Finally, the first casing portion 71 and the second casing portion 73 are attached to each other. The perforated plate 47 is then stored inside the first casing portion 71, with a small gap remaining between the perforated plate 47 and this first casing portion 71.

The injection and mixing device has many advantages.

By appropriately selecting the angle of the perforated plate and/or the void ratio, the distribution of the exhaust gas stream between the first and second passage is influenced. The stream in the second passage is chosen to deflect the liquid jet only slightly. Minimising the deflection of the liquid stream causes it to penetrate deep into the second passage, towards the outlet.

When the casing is comprised of a first casing portion and a second casing portion attached to each other, the installation of the injection and mixing device is facilitated.

Installation is particularly easy when the impactor plate is integral with the second casing portion and the perforated plate is integral with the first casing portion, the perforated plate and the impactor plate being disengaged from each other.

The fact that the deflector comprises a tubular deflector portion constituting a downstream section of the second passage allows the low-velocity fraction of the exhaust gases leaving the second passage to be re-accelerated. This is because the cross-sectional area offered to the exhaust gas by the tubular deflector portion is reduced compared to the volume of the second passage in which the injection is carried out.

As mentioned above, the fact that the tubular deflector portion is coaxial with the tubular casing portion makes it possible to obtain flows at the outlet of the first passage and at the outlet of the second passage which are parallel to each other. This helps to limit back pressure.

The first and second passages are located on either side of the impactor plate. This means that it is kept at a high temperature by the exhaust gases, which reduces the risk of a solid deposit forming on the impactor plate.

The fact that the tubular deflector portion and the tubular casing portion define between them an annular channel constituting a downstream section of the first passage means that the tubular deflector portion is also kept at a high temperature. The risk of deposits is reduced.

In addition, the exhaust gases passing through the impactor plate and flowing into the tubular deflector portion have a flow that is not disturbed by the high velocity gas stream.

The fact that the tubular deflector portion extends beyond the tubular casing portion into the flexible duct means that the attachment of the flexible duct to the tubular casing portion is not exposed to the injected liquid. This is favourable for the durability of this attachment over time.

The presence of the tubular deflector portion makes it possible to arrange an impactor or a mixer inside this tubular deflector portion.

Such a member could not be attached in the flexible duct, which is not rigid enough to allow such an attachment.

The fact that the inlet region has a narrowing cross-section from the exhaust inlet to the inlet of the first passage helps to maintain the velocity of the stream and therefore avoids the need to re-accelerate it later, which is an additional energy expenditure.

The injection and mixing device can have many variants.

The exhaust inlet may not be on a wall of the casing facing the exhaust outlet. This inlet could be on the side or even on the bottom of the casing.

The injection and mixing device is configured in such a way that it is not necessary to place the injector strictly in front of the exhaust outlet. As explained above, this injector can be slightly offset, as the direction of injection is not necessarily strictly parallel to the central axis.

The invention claimed is:

1. An injection and mixing device for an exhaust line, the injection and mixing device comprising:
   a casing having an exhaust inlet and an exhaust outlet, the casing internally defining a passage for exhaust gases from the exhaust inlet to the exhaust outlet, the exhaust inlet opening into an inlet region of the passage;
   an injector of a liquid comprising a nitrogen oxide reducing agent or a precursor of the nitrogen oxide reducing agent, the injector being mounted on a wall of the casing directed towards the exhaust outlet, and the injector injecting liquid in a direction of injection towards the exhaust outlet;
   a deflector housed within the casing and defining in the passage a first passage connecting the inlet region to the exhaust outlet, in which the exhaust gases flow at a first average velocity, and a second passage connecting the inlet region to the exhaust outlet, in which the exhaust gases flow at a second average velocity lower than the first average velocity, the injector injecting liquid into the second passage, and wherein the deflector comprises an impactor plate that is interposed between the injector and the exhaust outlet, and wherein the impactor plate is planar and has a less than 25° angle normal to the direction of injection; and
   wherein the deflector includes a perforated plate that is upstream from the impactor plate, and including a gap between a downstream edge of the perforated plate and an upstream edge of the impactor plate.

2. The device according to claim 1, wherein the deflector comprises a perforated plate, through which the second passage communicates with the inlet region.

3. The device according to claim 2, wherein the perforated plate forms an angle of between 0° and 60°, with a central axis of the exhaust inlet.

4. The device according to claim 3, wherein the angle is between 30° and 45° with the central axis of the exhaust inlet.

5. The device according to claim 2, wherein the perforated plate has a void ratio of between 10% and 70%.

6. The device according to claim 2, wherein the perforated plate has a void ratio of between 40% and 55%.

7. The device according to claim 1, wherein the deflector further comprises a perforated plate, through which the second passage communicates with the inlet region, wherein the casing comprises a first casing portion and a second casing portion attached to each other, the perforated plate being integral with the first casing portion, the impactor plate being integral with the second casing portion, the perforated plate and the impactor plate being disengaged from each other.

8. The device according to claim 1, wherein the casing comprises a tubular casing portion defining the exhaust outlet, the deflector comprising a tubular deflector portion engaged in the tubular casing portion and constituting a downstream section of the second passage.

9. The device according to claim 8, wherein the tubular deflector portion is coaxial with the tubular casing portion.

10. The device according to claim 8, wherein the tubular deflector portion and the tubular casing portion define between the tubular deflector portion and the tubular casing portion an annular channel constituting a downstream section of the first passage.

11. The device according to claim 8, wherein a flexible duct is mounted on the tubular casing portion, the tubular deflector portion extending beyond the tubular casing portion into the flexible duct.

12. The device according to claim 1, wherein the first passage has a passage inlet opening into the inlet region, the inlet region having a passage cross-section narrowing from the exhaust inlet to the passage inlet.

13. The device according to claim 1, wherein the impactor plate has a flat portion that faces the wall on which the injector is to be mounted.

14. The device according to claim 13, wherein the flat portion includes a hole that faces an injector opening in the wall.

15. The device according to claim 14, including a tubular deflector portion that has one end that surrounds the hole.

* * * * *